United States Patent
Chiu

(10) Patent No.: US 8,037,196 B2
(45) Date of Patent: Oct. 11, 2011

(54) METHOD FOR MAINTAINING COMMUNICATION BETWEEN COMMUNICATION DEVICES HAVING INCONSISTENT PROTOCOLS

(75) Inventor: Tienyu Chiu, Naperville, IL (US)

(73) Assignee: Alcatel Lucent, Paris (FR)

( * ) Notice: Subject to any disclaimer, the term of this patent is extended or adjusted under 35 U.S.C. 154(b) by 2436 days.

(21) Appl. No.: 10/180,170

(22) Filed: Jun. 26, 2002

(65) Prior Publication Data
US 2004/0003089 A1    Jan. 1, 2004

(51) Int. Cl.
G06F 15/16 (2006.01)
H04J 3/22 (2006.01)

(52) U.S. Cl. ........ 709/230; 709/224; 709/227; 709/206; 370/466; 370/467; 370/468; 370/469

(58) Field of Classification Search ........... 709/206.224, 709/227, 230, 206, 224; 370/466–467, 241
See application file for complete search history.

(56) References Cited

U.S. PATENT DOCUMENTS

| | | | | |
|---|---|---|---|---|
| 5,432,775 A * | 7/1995 | Crayford | | 370/248 |
| 5,491,687 A * | 2/1996 | Christensen et al. | | 370/253 |
| 5,610,903 A * | 3/1997 | Crayford | | 370/213 |
| 5,640,446 A * | 6/1997 | Everett et al. | | 379/114.28 |
| 5,778,189 A * | 7/1998 | Kimura et al. | | 709/236 |
| 5,841,985 A * | 11/1998 | Jie et al. | | 709/227 |
| 5,864,559 A * | 1/1999 | Jou et al. | | 370/465 |
| 5,991,303 A * | 11/1999 | Mills | | 370/402 |
| 6,014,440 A * | 1/2000 | Melkild et al. | | 379/269 |
| 6,072,803 A * | 6/2000 | Allmond et al. | | 370/445 |
| 6,081,840 A * | 6/2000 | Zhao | | 709/224 |
| 6,108,350 A * | 8/2000 | Araujo et al. | | 370/467 |
| 6,111,893 A * | 8/2000 | Volftsun et al. | | 370/466 |
| 6,125,122 A * | 9/2000 | Favichia et al. | | 370/466 |
| 6,282,574 B1 * | 8/2001 | Voit | | 709/230 |
| 6,285,659 B1 * | 9/2001 | Feuerstraeter et al. | | 370/244 |
| 6,324,583 B1 * | 11/2001 | Stevens | | 709/230 |
| 6,356,951 B1 * | 3/2002 | Gentry, Jr. | | 709/250 |
| 6,445,716 B1 * | 9/2002 | Favichia et al. | | 370/466 |
| 6,449,285 B1 * | 9/2002 | Mills | | 370/466 |
| 6,549,937 B1 * | 4/2003 | Auerbach et al. | | 709/206 |
| 6,668,319 B1 * | 12/2003 | Newell et al. | | 713/100 |
| 6,680,952 B1 * | 1/2004 | Berg et al. | | 370/467 |
| 6,741,610 B1 * | 5/2004 | Volftsun et al. | | 370/466 |
| 6,778,505 B1 * | 8/2004 | Bullman et al. | | 370/254 |
| 6,785,730 B1 * | 8/2004 | Taylor | | 709/230 |
| 6,845,091 B2 * | 1/2005 | Ogier et al. | | 370/338 |
| 6,894,979 B1 * | 5/2005 | Lee | | 370/241 |
| 6,901,449 B1 * | 5/2005 | Selitrennikoff et al. | | 709/230 |

(Continued)

Primary Examiner — John Follansbee
Assistant Examiner — Saket K Daftuar
(74) Attorney, Agent, or Firm — Steven R. Santema

(57) ABSTRACT

A method for supporting communication between communication devices (102, 104, 106) having inconsistent protocols, such as may result from protocol changes or upgrades. Protocol registers (302, 304) maintained in association with the communication devices contain respective first and second protocols (e.g., current and previous protocols) of the communication devices. A sending (or receiving) device, upon being upgraded from protocol C to N, updates (206) its protocol register to indicate N as the current protocol and C as the previous protocol. The device initially attempts to send (222) a message (or attempts 212 to recognize a message) using its current protocol N and, if that fails, the device sends (230) (or attempts 216 to recognize the message) using its previous protocol C. In such manner, when a communication device is upgraded to a new protocol causing a protocol inconsistency with a peer device, the communication device may revert to its previous protocol to restore communication relatively quickly.

11 Claims, 3 Drawing Sheets

U.S. PATENT DOCUMENTS

| | | | |
|---|---|---|---|
| 6,910,148 B1 * | 6/2005 | Ho et al. | 714/4 |
| 6,912,230 B1 * | 6/2005 | Salkini et al. | 370/466 |
| 6,917,594 B2 * | 7/2005 | Feuerstraeter et al. | 370/244 |
| 6,931,647 B1 * | 8/2005 | Firth et al. | 719/332 |
| 2001/0036167 A1 * | 11/2001 | Menon et al. | 370/337 |
| 2004/0120421 A1 * | 6/2004 | Filipovic | 375/316 |
| 2004/0249664 A1 * | 12/2004 | Broverman et al. | 705/2 |
| 2004/0267933 A1 * | 12/2004 | Przybylski et al. | 709/227 |

* cited by examiner

LOGICAL NETWORK TOPOLOGY

METHOD FOR MAINTAINING COMMUNICATION BETWEEN COMMUNICATION DEVICES HAVING INCONSISTENT PROTOCOLS

FIELD OF THE INVENTION

This invention relates generally to communication systems, and, more particularly, to a method that allows communication to be maintained between devices having inconsistent protocols, such as may result from protocol changes or upgrades. This invention is applicable to both circuit and packet domains.

BACKGROUND OF THE INVENTION

In recent years, technological advances have made possible the convergence of widely different technologies, such as telephony, computer and cable technologies, wireline and wireless technologies, and so forth, into heterogeneous networks offering a variety of services. Interoperability between different communication entities of such networks, or even between different entities of a homogenous network (e.g., between two telephony devices, computer devices, etc.) is made possible by using certain standard or proprietary interface protocols between the devices. Examples of known protocols include, without limitation, H.323, IPDC, H.248, SNMP and CORBA. Generally, communication between any peer entities (i.e., sending and receiving devices) cannot occur unless both devices use the same interface protocol. Thus, if a receiving device uses a different interface protocol than a sending device (or perhaps a different software version of the same interface protocol), any message(s) sent from the sending device to the receiving device will not be recognized or understood, causing a loss of communication.

A problem that arises is that as new interface protocols are introduced into the network or as existing protocols are upgraded, the changes/upgrades are made independently, inevitably at different times in different peer devices. Moreover, any particular sending or receiving device—whether or not it has received a protocol change/upgrade—will generally use its most recent protocol exclusively without regard to the protocols used by other peer devices. Indeed, most devices do not know which protocol other peer devices are using. Consequently, when changes/upgrades occur in a communication device, there can be a significant period of time when communication is lost between that device and one or more peer devices; communication is not restored until the peer devices have been transitioned to the same protocol.

A related problem is that different communication devices of a communication network can be manufactured, serviced and maintained by different vendors, such that a coordinated schedule may not exist for performing timely protocol changes in multiple entities/devices. Consequently, service and maintenance personnel associated with a communication device undergoing a protocol change/upgrade may not know when other peer devices will be upgraded to the same protocol. The transition period may comprise several hours, days or weeks, depending on the type of change/upgrade, operational procedures, common practices and the like. Clearly, during such a prolonged and/or indefinite transition period, the inability for peer devices to communicate due to a protocol inconsistency may significantly affect services provided by the network. For example, an inconsistency in a call signaling/control protocol between two or more telephony devices may render the devices unable to set up or tear down voice calls.

Accordingly, there is a need for communication device(s) having inconsistent protocols, such as may result from changes/upgrades, to maintain communications during prolonged or indefinite transition periods.

SUMMARY OF THE INVENTION

This need is answered and a technical advance is achieved in the art by a feature whereby communication device(s), subject to protocol upgrades at different times, maintain protocol registers containing respective first and second protocols (e.g., current and previous protocols). Upon the communication device(s) receiving a new protocol, the new protocol replaces the first protocol and the current protocol replaces the second protocol in the protocol register. The new protocol thereby becomes the new "first" (or current) protocol and the former current protocol becomes the new "second" (or previous) protocol. The communication devices initially attempt to communicate using their current protocols and, if communication fails (as would occur in the case of a protocol inconsistency), either of the communication devices can change to its previous protocol in an attempt to support the communication. In such manner, when a communication device is upgraded to a new protocol causing a protocol inconsistency with a peer device, the communication device may revert to its previous protocol to restore communication relatively quickly.

In accordance with one embodiment of the present invention, a sending device maintains a protocol register containing a first and second protocol (e.g., a current and previous protocol). The sending device sends a message to a peer device using the first protocol and determines, either from non-responsiveness of the peer device within a designated time or from receiving indicia of confusion by the peer device, that the peer device is using a protocol inconsistent with the first protocol. If the sending device determines that the peer device is using a protocol inconsistent with the first protocol, the sending device retrieves the second protocol from the protocol register and sends a message to the peer device using the second protocol.

In accordance with another embodiment of the present invention, a receiving device maintains a protocol register containing a first and second protocol (e.g., a current and previous protocol). The receiving device receives a message from a peer device and attempts to process the message using the first protocol. If the receiving device is unable to process the message using the first protocol, the receiving device retrieves the second protocol from the protocol register and attempts to process the message using the second protocol. If the receiving device is unable to process the message using the second protocol, the receiving device sends a message to the peer device including indicia of confusion.

BRIEF DESCRIPTION OF THE DRAWINGS

The foregoing and other advantages of the invention will become apparent upon reading the following detailed description and upon reference to the drawings in which.

DESCRIPTION OF THE PREFERRED EMBODIMENT(S)

Figure 1:
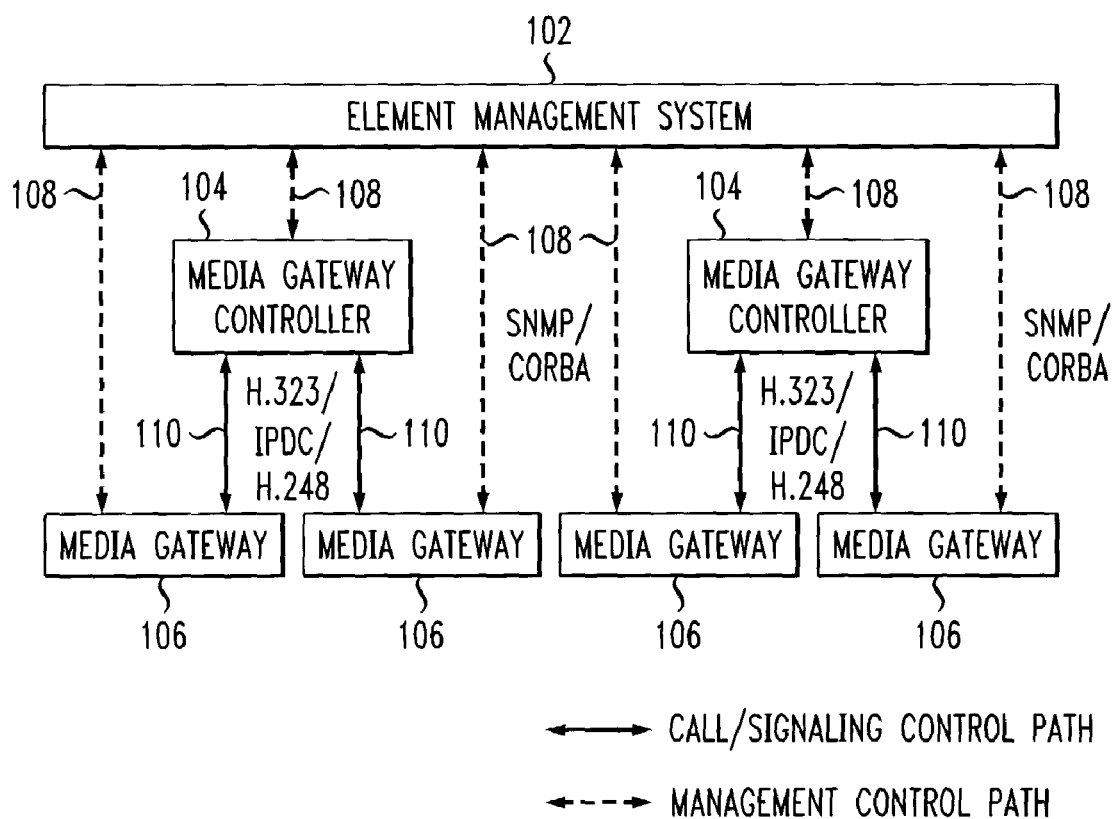
FIG. 1 is a block diagram of a representative communication system including communication entities using potentially inconsistent protocols.

FIG. 1 shows by way of example and not limitation, a communication system 100 comprising an element management system 102, a plurality of media gateway controllers 104 and a plurality of media gateways 106. The element management system 102, media gateway controllers 104 and media gateways 106 include respective processors (such as microprocessors, digital signal processors or combination of such devices) and memory (such as volatile or non-volatile digital storage devices or combination of such devices). As shown, the element management system 102 communicates, via management control paths 108, with the media gateway controllers 104 and media gateways 106; and the media gateway controllers 104 communicate with the media gateways via call/signaling control paths 110. As will be appreciated the management control paths 108 and call/signaling control paths 110 are logical links that may be physically realized by wireless or wireline links.

The element management system 102, media gateway controllers 104 and media gateways 106 are adapted to communicate using common interface protocols, which protocols are typically selected from among a plurality of eligible protocol types corresponding to certain device or link characteristics. As shown, for example, protocols eligible for use on the management control paths 108 include SNMP (Simple Network Management Protocol) or CORBA (Common Object Request Broker Architecture) and protocols eligible for use on the call/signaling control paths 110 include H.323, IPDC (Internet Protocol Device Control) or H.248. As will be appreciated, these protocols are indicated by way of example and not limitation.

Generally, for communication to occur between any two devices, both devices must use the same interface protocol. Thus, with reference to FIG. 1, communication along path 108 between element management system 102 and media gateway 106 relies upon both devices using SNMP, or both devices using CORBA; but communication will not occur if one device uses SNMP and the other device uses CORBA. Similarly, among two devices initially communicating using the same protocol, communication will be lost, at least temporarily, when one of the devices changes or upgrades to a new protocol. The present invention is directed to restoring communication relatively quickly among devices having inconsistent protocols, by providing a method for device(s) to store a first and second protocol (e.g., current and previous protocol) and, if communication is not established using the first protocol, changing to the second protocol in an attempt to support the communication.

Figure 2:
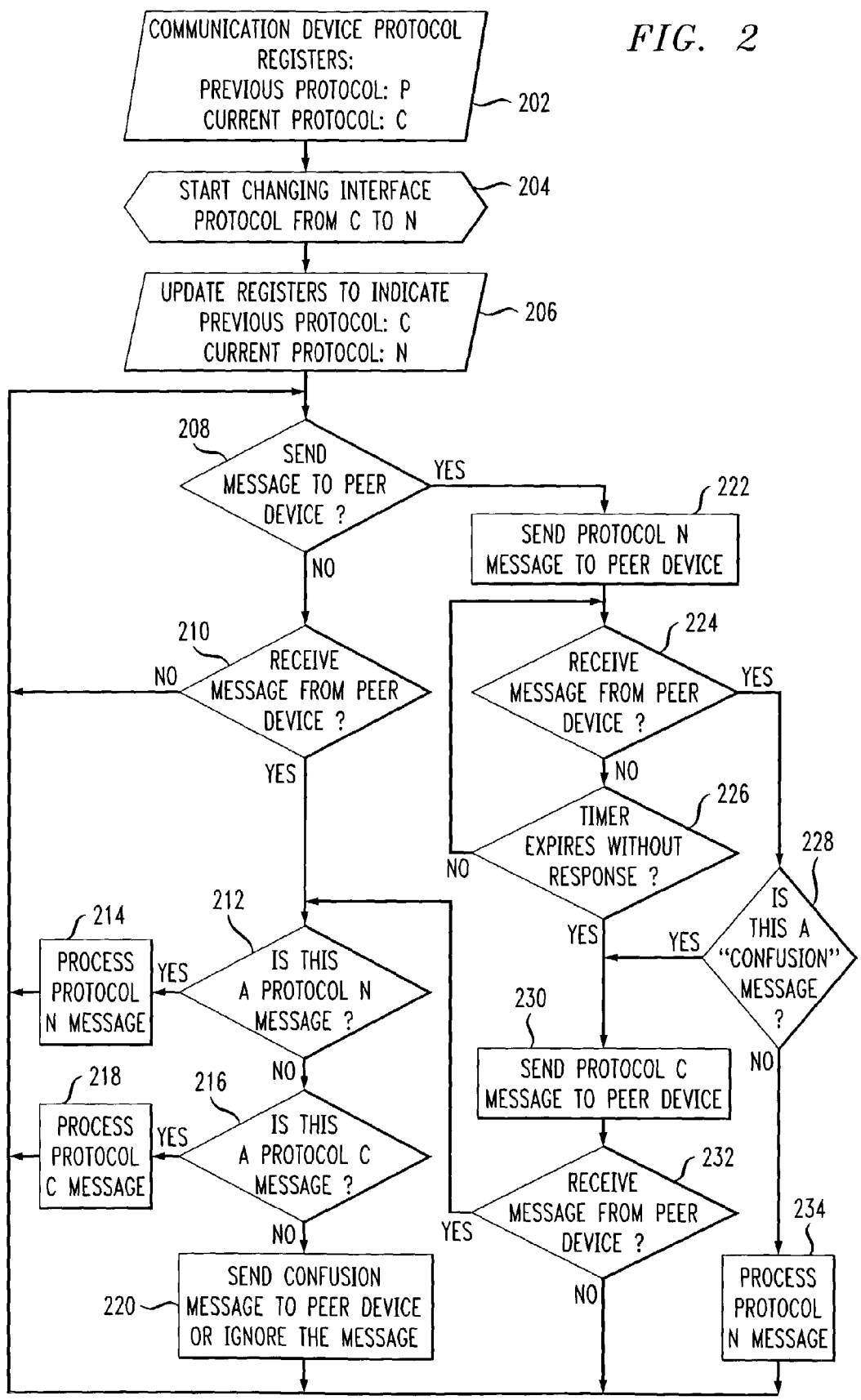
FIG. 2 is a flowchart showing a method for changing interface protocols in a communication device, causing potentially inconsistent protocols with a peer device, without significantly disrupting communication with the peer device according to one embodiment of the present invention.

Referring to FIG. 2, there is shown a flowchart of a method for maintaining communication among devices having potentially inconsistent protocols resulting from protocol changes or upgrades. The steps of FIG. 2 are implemented, where applicable, using stored software routines within a particular communication device or devices. At step 202, a communication device maintains a protocol register storing a first and second protocol (as shown, a current protocol C and a previous protocol P). For example, with reference to FIG. 1, presume that media gateway controller 104 has previously used protocol H.323 and is currently using protocol IPDC. In such case, IPDC represents the current (or "first") protocol C and H.323 represents the previous (or "second") protocol P. The media gateway controller 104 stores both H.323 (i.e., P) and IPDC (i.e., C) in its protocol register. For convenience, the portion of the protocol register containing the first protocol will hereinafter be referred to as a "first register" or "current protocol register" and the portion of the register containing the second protocol will be referred to as a "second register" or "previous protocol register," as appropriate.

In the preferred embodiment, first and second protocol registers reside and are independently maintained within the memory of different peer devices of a communication network. Thus, for example, with reference to FIG. 1, each of the element management system 102, media gateway controllers 104 and media gateways 106 independently maintain respective first and second protocol registers which in one embodiment, define current and previous protocol registers. Alternatively, a centralized entity, such as a central controller (not shown) may maintain first and second registers associated with the various devices.

At step 204, the communication device receives a protocol change from C to a new protocol ("N"). Thus, continuing the present example, media gateway controller 104, currently using protocol IPDC, may be upgraded to a new protocol H.248. Then, at step 206, the communication device updates its protocol register by replacing the former current protocol C with the new protocol N in the first protocol register and replacing the former previous protocol P with the former current protocol C in the second protocol register. The new protocol N thereby becomes the current (or "first") protocol and the former current protocol becomes the previous (or "second") protocol. Thus, in the present example, media gateway controller stores H.248 (i.e., "N") in its first protocol register and IPDC (i.e., "C") in its second protocol register. The former previous protocol (e.g., H.323) may be discarded or, alternatively, stored in a third protocol register.

As will be appreciated, certain devices might initially contain only a current protocol C but no previous protocol P (as might occur in devices never having received a protocol upgrade). In such case, the current protocol is stored in the first protocol register and no protocol is stored in the second protocol register. In this instance, upon receiving a protocol change from C to N, the communication device updates its protocol register by replacing the former current protocol C with the new protocol N in the first protocol register and then storing protocol C in the formerly empty second protocol register.

At step 208, a determination is made whether the communication device desires to send a message to a peer device. If the communication device does not desire to send a message, flow proceeds to step 210 where it is determined whether the communication device has received a message from a peer device. For convenience, the term "sending device" will refer to a communication device that desires to send a message at step 208 and the term "receiving device" will refer to a communication device that receives a message at step 210. As will be appreciated, generally any communication device can be a sending device or receiving device.

Upon the communication device ("receiving device") receiving a message at step 210, it determines at step 212 whether the message is consistent with its current protocol N. If so, the receiving device processes the protocol N message at step 214 and returns to step 208. If the message is not a protocol N message, the process flows to step 216 where the receiving device determines whether the message is consistent with its previous protocol C. If so, the receiving device processes the protocol C message at step 218 and returns to step 208. If the message is not a protocol N or protocol C message, the receiving device will be unable to process the message. At step 220, if the receiving device cannot process the message, it optionally ignores the message or replies to the sender with a message (hereinafter termed a "confusion" message) indicating that it is unable to process the message.

In summary, therefore, a receiving device uses its current protocol in an initial attempt to recognize the message. If the message is not recognized using the current protocol, the receiving devices uses its previous protocol in attempt to recognize the message. If the receiving device does not recognize the message using either its current or previous protocol, it either does not respond or responds with a "confusion" message. For example, with reference to FIG. 1, suppose the media gateway controller 104, having protocol H.248 in its current protocol register and IPDC in its previous protocol register, receives a message from the media gateway 106. The media gateway controller will first attempt to process the message using its current protocol H.248. If the media gateway controller is unable to process the message using H.248, it attempts to process the message using its previous protocol IPDC. If both attempts are unsuccessful, the media gateway controller either does not respond or sends a "confusion" message to the media gateway 106.

In the case of a sending device (i.e., upon a positive determination at step 208), the process proceeds to step 222 where the sending device uses its current protocol N initially to send a message to a peer device, starts a wait timer and waits to receive a message(s) from the peer device. The wait time may be predetermined or dynamically determined and may be varied for different devices, protocols and the like. As will be appreciated, the wait timer may be implemented by a number of alternative timing schemes including, without limitation, count-up timers, count-down timers or absolute times.

At steps 224, 226, a determination is made whether a message is received before expiration of the wait timer. If a message is received, the sending device determines at step 228 whether the message is a "confusion" message. If the message is not a "confusion" message (as would occur when the peer device is using the same protocol N as the sending device), the sending device processes the protocol N message at step 234 and the process ends until such time as the communication device sends (or receives) another message at step 208 (or 210).

If the message is a "confusion" message, or the wait timer expires without the sending device receiving a message from peer device, the sending device determines that the recipient device is using an inconsistent protocol and did not recognize the current protocol N message. In such case, at step 230, the sending device retrieves its previous protocol C from the protocol register and sends a message using its previous protocol C.

If a message is received from the peer device in response to sending the protocol C message, determined at step 232, the sending device initially at steps 212, 214 attempts to process the message using its current protocol N and, if that fails, the sending device attempts at steps 216, 218 to process the message using its previous protocol C, substantially as has been described. If a message is not received from the peer device in response to sending the protocol C message, determined at step 232, the process ends until such time as the communication device sends (or receives) another message at step 208 (or 210).

In summary, therefore, a sending device uses its current protocol in an initial attempt to set up a communication with a peer device. If a "confusion" message is received or a wait timer expires, the sending device determines that the peer device is using an inconsistent protocol and uses its previous protocol in attempt to set up the communication. Referring again, therefore, to the example of the media gateway controller 104, having protocol H.248 in its current protocol register and IPDC in its previous protocol register, assume that the media gateway controller desires to send a message to the media gateway 106. The media gateway controller will first attempt to send the message using its current protocol H.248. If it receives a "confusion" message or a wait timer expires, it will attempt to send a message using its previous protocol IPDC.

Figure 3:
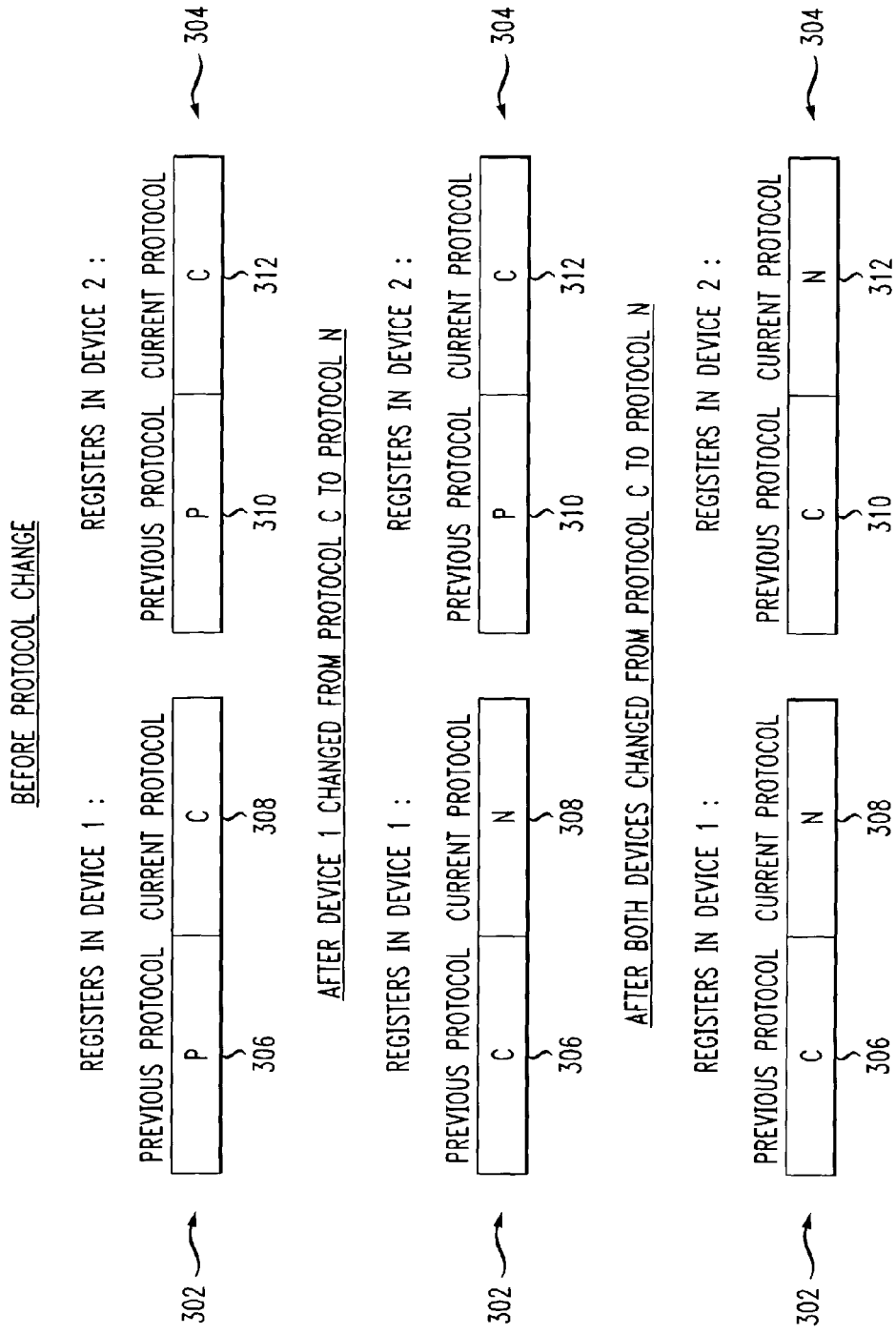
FIG. 3 illustrates exemplary contents of protocol registers maintained by first and second devices before a protocol change, during a transition period where the devices have inconsistent protocols, and after a protocol change in both devices.

FIG. 3 shows example protocol registers 302, 304 maintained by two peer devices, referred to as "device 1" and "device 2." Before a protocol change in either device, register 302 of device 1 includes first and second protocol registers 308, 306 containing respective current and previous protocols C and P. Similarly, in device 2, register 304 includes first and second protocol registers 312, 310 containing respective current and previous protocols C and P. Communication is supported between device 1 and device 2 because both devices are using the same current protocol, C.

Upon device 1 receiving a protocol upgrade (i.e., to new protocol N), N becomes the current protocol and C becomes the previous protocol of device 1. Accordingly, N replaces C in protocol register 308 and C replaces P in protocol register 306 of device 1. This creates a protocol inconsistency with device 2, which device, not yet having received a protocol upgrade, is still using C as its current protocol and P as its previous protocol. According to principles of the present invention, communication may still be supported between device 1 and device 2 during this transition period. As has been described, if device 1 desires to send a message to device 2, it initially attempts to send a message using its current protocol (i.e., N, after receiving the protocol upgrade). Device 2 will initially attempt to process the message using its current protocol (i.e., C) and, because of the protocol inconsistency between N and C, will be unable to process the message. Device 2 responds with a "confusion" message, or does not respond. Device 1 interprets the response (or lack of response) as an indication that device 2 is using an inconsistent protocol. Device 1 thereby re-sends the message (or sends a separate message) using its previous protocol (i.e., C) and device 2 will successfully process the message using its current protocol C. Similarly, if device 1 receives a message from device 2 during the transition period, it initially attempts to process the message using its current protocol (i.e., N, after receiving the protocol upgrade). Device 1 will be unable to process the message using protocol N but will successfully process the message after switching to protocol C.

Some time later, upon device 2 receiving a protocol upgrade (i.e., to new protocol N), N becomes the current protocol and C becomes the previous protocol of device 2. Accordingly, N replaces C in protocol register 312 and C replaces P in protocol register 310 of device 2. This removes the protocol inconsistency and communication is supported between device 1 and device 2 because both devices are now using the same current protocol, N.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising a sending device performing steps of:
    maintaining a protocol register containing a first and second protocol;
    using the first protocol, and without knowing in advance whether a peer device is using the first protocol, attempting delivery of a message to the peer device;
    determining that the message was not successfully received by the peer device, thereby indicating that the peer device is using a protocol inconsistent with the first protocol; and
    responsive to determining the message was not successfully received by the peer device, retrieving the second protocol from the protocol register; and without knowing in advance whether the peer device is using the second protocol, attempting delivery of a message from the sending device to the peer device using the second protocol;
    wherein the step of maintaining a protocol register comprises:
    storing, in a first register of the sending device, a current protocol;
    storing, in a second register of the sending device, a previous protocol; and
    upon the sending device receiving a new protocol,
        in the first register, replacing the current protocol with the new protocol, the new protocol defining the first protocol and the current protocol defining a former current protocol;
        in the second register, replacing the previous protocol with the former current protocol, the former current protocol defining the second protocol.

2. The method of claim 1, wherein the step of maintaining a protocol register comprises:
    storing, in a first register of the sending device, a current protocol; and
    upon the sending device receiving a new protocol,
        in the first register, replacing the current protocol with the new protocol, the new protocol defining the first protocol and the current protocol defining a former current protocol;
        in a second register, storing the former current protocol, the former current protocol defining the second protocol.

3. The method of claim 1, wherein the step of determining comprises:
    determining that a response is not received from the peer device within a designated time period after sending the message.

4. The method of claim 1, wherein the step of determining comprises:
    receiving a response from the peer device including indicia of confusion of the peer device.

5. The method of claim 1, wherein the first protocol comprises a current protocol and the second protocol comprises a previous protocol of the sending device.

6. A method comprising a receiving device performing steps of:
    maintaining a protocol register containing a first and second protocol associated with the receiving device;
    receiving a message from a peer device;
    without knowing in advance a protocol used by the peer device, unsuccessfully attempting to process the message using the first protocol; and
    responsive to unsuccessfully attempting to process the message using the first protocol, retrieving the second protocol from the protocol register; and attempting to process the message using the second protocol;
    wherein the step of maintaining a protocol register comprises:
    storing, in a first register of the receiving device, a current protocol;
    storing, in a second register of the receiving device, a previous protocol; and
    upon the receiving device receiving a new protocol,
        in the first register, replacing the current protocol with the new protocol, the new protocol defining the first protocol and the current protocol defining a former current protocol;
        in the second register, replacing the previous protocol with the former current protocol, the former current protocol defining the second protocol.

7. The method of claim 6, wherein the step of maintaining a protocol register comprises:
    storing, in a first register of the receiving device, a current protocol; and
    upon the receiving device receiving a new protocol,
        in the first register, replacing the current protocol with the new protocol, the new protocol defining the first protocol and the current protocol defining a former current protocol;
        in a second register, storing the former current protocol, the former current protocol defining the second protocol.

8. The method of claim 6 further comprising:
    unsuccessfully attempting to process the message using the second protocol; and
    responsive to unsuccessfully attempting to process the message using the second protocol, sending a message to the peer device including indicia of confusion.

9. The method of claim 6, wherein the first protocol comprises a current protocol and the second protocol comprises a previous protocol of the receiving device.

10. In a communication system including at least a first and second device adapted for communication using a common protocol, the first and second devices each maintaining protocol registers containing a first and second protocol and each being subject to protocol upgrades at different times causing a protocol inconsistency, a method comprising:
    upon either of the first and second devices receiving a new protocol, replacing the first protocol with the new protocol, the new protocol defining the current protocol; and replacing the second protocol with the first protocol, the first protocol defining the previous protocol;
    sending, from the first device to the second device, a message using a current protocol of the first device without knowing in advance whether the second device is using the current protocol of the first device;
    without knowing in advance the protocol used by the first device, unsuccessfully attempting, by the second device, to process the message using a current protocol of the second device;
    responsive to the second device unsuccessfully attempting to process the message using the current protocol of the second device, attempting, by the second device, to process the message using a previous protocol of the second device.

11. The method of claim 10, further comprising:
    determining, by the first device, that the second device is unable to process the message sent using the current protocol of the first device; and
    sending, from the first device to the second device, a message using a previous protocol of the first device.

* * * * *